(12) United States Patent
Minoue et al.

(10) Patent No.: US 8,569,664 B2
(45) Date of Patent: Oct. 29, 2013

(54) HARDENING METHOD AND HARDENING DEVICE

(75) Inventors: Junji Minoue, Nara (JP); Hiroko Watanabe, Osaka (JP); Masayuki Koyama, Nara (JP); Hideo Miyashita, Osaka (JP)

(73) Assignee: Fuji Electronics Industry Co. (JP)

( * ) Notice: Subject to any disclaimer, the term of this patent is extended or adjusted under 35 U.S.C. 154(b) by 910 days.

(21) Appl. No.: 12/653,310

(22) Filed: Dec. 10, 2009

(65) Prior Publication Data

US 2010/0147831 A1    Jun. 17, 2010

(51) Int. Cl.
*H05B 6/02* (2006.01)

(52) U.S. Cl.
USPC .......................... 219/600; 384/622

(58) Field of Classification Search
USPC .......................... 219/600; 384/622
See application file for complete search history.

(56) References Cited

U.S. PATENT DOCUMENTS

2006/0165334 A1*   7/2006   Obayashi et al. ............. 384/622

FOREIGN PATENT DOCUMENTS

| JP | 2001-115211 | 4/2001 |
|----|-------------|--------|
| JP | 2007-262440 | 10/2007 |

* cited by examiner

*Primary Examiner* — Edward Wojciechowicz
(74) *Attorney, Agent, or Firm* — Wood, Phillips, Katz, Clark & Mortimer

(57) ABSTRACT

An object of the present invention is to provide a hardening method and a hardening device capable of successfully hardening a shaft and an inner wall of a hole of a work in which the hole is formed close to the shaft on a flat plate. A hardening device for hardening a shaft and an inner wall of a hole, the shaft extending vertically from a flat plate and the hole being formed adjacent to the shaft, includes a first heating coil that is a conductive body facing the shaft and a second heating coil that is a helical conductive body having at least a portion inserted into the hole, so that the first heating coil and the second heating coil heat the shaft and the inner wall of the hole respectively and simultaneously.

8 Claims, 10 Drawing Sheets

HARDENING METHOD AND HARDENING DEVICE

BACKGROUND OF THE INVENTION

1. Field of the Invention

The present invention relates to hardening methods and hardening devices, more specifically to a hardening method and a hardening device for hardening a work having a shaft and a hole on a flat plate.

2. Description of the Related Art

Conventionally, a built-up crank is assembled after every component thereof is hardened. Herein, a built-up crank is a crank having a configuration shown in FIGS. 13A and 13B. As shown in FIG. 13A, a part 51, which is one component of a built-up crank 50, has a configuration in which a shaft 54 is unitarily formed in a center of a flat plate (circular plate) 53. The flat plate 53 also has a hole 55, which is formed close to the shaft 54. Further, as shown in FIG. 13B, a pin 52, which is another component, is fixed to the hole 55 by means such as a close fit. The built-up crank 50 is constituted by combining two flat plates 53 of two parts 51 by the common pin 52.

As seen in the part 51 of the crank 50, there is a work (object to be hardened) having a complicated configuration in which a portion (shaft 54) extending from the flat plate 53 and the hole 55 are close to each other. Such an intricately-shaped work has conventionally subjected to hardening onto individual components (the shaft 54 and an inner wall of the hole 55 in this case) by a device such as a hardening device disclosed in a patent document 1 specified below or a helical heating conductive body.

Patent Document 1: JP 2001-115211 A

SUMMARY OF THE INVENTION

Problem to be Solved by the Invention

However, there is a possibility that a plurality times of hardenings onto the same work might break or anneal a part where hardenings are duplicated. Alternatively, there is a possibility that an unhardened part might come out by heating the work in moderation so as to prevent a duplicated hardening to avoid breaking or annealing. Consequently, some part might undergo duplicated hardenings at a boundary between the shaft 54 and the hole 55 or some part might not undergo hardening at all at the boundary therebetween. A force acts on the hole 55 in several directions via the pin 52 inserted in the hole 55. Therefore, it is necessary to increase the hardness (strength) of an inner wall 55a of the hole 55 by hardening. Further, it is necessary to increase the hardness (strength) of the shaft 54 by hardening since a force also acts on the shaft 54 in several directions.

Taking into account with the above-mentioned problem of the related art, the present invention therefore aims to provide a hardening method and a hardening device capable of successfully hardening a shaft and an inner wall of a hole of a work in which the hole is formed close to the shaft on a flat plate.

Means to Solve the Problem

A first aspect of the present invention proposed herein to solve the above-mentioned problem is a hardening method for hardening a shaft and an inner wall of a hole of a work, the shaft vertically extending from a flat plate of the work and the hole formed adjacent to the shaft, the method including the step of heating the shaft by high-frequency induction with a first heating coil and simultaneously heating the inner wall by high-frequency induction with a second heating coil.

According to the first aspect of the present invention, the shaft and the inner wall of the hole adjacent to the shaft of the work is simultaneously hardened by high-frequency induction heating, the shaft being heated with the first heating coil and the inner wall being heated with the second heating coil. That achieves a favorable induction heating of the shaft and the inner wall of the hole respectively. Further, simultaneous induction heating of the work with the first heating coil and the second heating coil brings about a continuous hardened pattern and a favorable hardening even with a part subjected to overlapped heating by the both heating coils.

Preferably, the first heating coil is a conductive body for conducting a high-frequency current and configured to be allowed to move vertically relative to an axis of the work and the second heating coil is a helical conductive body having at least a portion inserted in the hole of the work.

By this preferred aspect, the first heating coil is easy to face the shaft and the second heating coil is easy to be arranged in the inner wall of the hole. That achieves a favorable induction heating of both the shaft and the inner wall of the hole.

Herein, the conductive body for conducting a high-frequency current and configured to be allowed to move vertically relative to an axis of the work indicates an induction heating coil having a configuration denoted by the numeral 2 in FIG. 14. The conductive body having such a configuration as the first heating coil is so called a semi-open coil or a saddle-shaped coil. The semi-open coil is arranged so as to face a half part of a peripheral wall of the shaft of a columnar shape with no coil facing a remaining half part of the peripheral wall. Thus, the coil can approach and be away from the shaft in a radial direction.

It is also possible to rotate the work around the hole and simultaneously moving the first heating coil in a circular manner so that the first heating coil moves together with the shaft.

That makes the shaft revolve around the hole with drawing a circular track. The first heating coil moves together with the shaft, so that both the inner wall of the hole and the shaft are well heated by induction.

Alternatively, it is possible to rotate the work around the shaft and simultaneously moving the second heating coil in a circular manner so that the second heating coil moves together with the hole.

That performs a favorable induction heating of the whole peripheral wall of the shaft even with the first heating coil being static. Further, the hole revolves around the shaft with drawing a circular track. The second heating coil moves together with the hole, so that both the shaft and the inner wall of to the hole are well heated by induction.

It is also possible to supply electricity to the first heating coil and to the second heating coil from different power sources respectively.

By such an arrangement, different frequencies are allocated to the currents supplied from the respective power sources. As a consequence, a part subjected to overlapped heating by the both heating coils is well heated by induction.

Herein; the different power sources indicate two high-frequency converters (or transmitters or energizing means) adapted to generate high-frequency currents having different frequencies from an alternating current supplied from a commercial power source.

The portion of the second heating coil inserted in the hole may be wound in such a manner that the number of coil turns between coil windings at a part nearer the shaft in the inner wall of the hole is different from that at a part farther from the shaft.

In such an arrangement, it is preferable that the number of the coil turns at the part nearer the shaft is more than that at the part farther from the shaft.

Alternatively, the portion of the second heating coil inserted in the hole may be wound in such a manner that pitches between the coil windings at the part nearer the shaft are different from those at the part farther from the shaft.

The hardening method may rotate the device with supporting the shaft eccentrically positioned from the hole that is a rotational center. The shaft is preferably held by a chuck.

A second aspect of the present invention is a hardening device for hardening a shaft and an inner wall of a hole of a work, the shaft vertically extending from a flat plate of the work and the hole formed adjacent to the shaft, the device including a first heating coil facing the shaft and a second heating coil having at least a portion inserted in the hole, so that the first heating coil and the second heating coil heat by induction the shaft and the inner wall of the hole respectively and simultaneously.

The hardening device of the present aspect hardens a shaft vertically extending from a flat plate of a work and an inner wall of a hole formed adjacent to the shaft. The first heating coil faces the shaft so as to harden the shaft well. The second heating coil is arranged in the hole so as to harden the inner wall of the hole well. Further, simultaneous induction heating of the shaft and the inner wall of the hole with the first heating coil and the second heating coil brings about a continuous hardened pattern and a favorable hardening even with apart subjected to overlapped heating by the both heating coils.

The first heating coil may be a conductive body for conducting a high-frequency current and configured to be allowed to move vertically relative to an axis of the work and the second heating coil may be a helical conductive body having at least a portion inserted in the hole of the work.

Such an arrangement facilitates arrangement of the first heating coil so as to face the shaft, thereby achieving a favorable induction heating of the shaft. Further, since being helical, the second heating coil is easy to be arranged in the hole, thereby achieving a favorable induction heating of the inner wall of the hole. Consequently, both the shaft and the inner wall of the shaft are well heated by induction.

The hardening device may further include a work rotating means for rotating the work around the hole and a coil moving mechanism for moving the first heating coil together with movement of the shaft generated by rotation of the work.

By such an arrangement, the work rotates around the hole by the work rotating means. Thereby, the inner wall of the hole moves in a peripheral direction relative to the helical second heating coil inserted in the hole, so as to be uniformly heated by induction. Further, the coil moving mechanism is provided for moving the first heating coil together with movement of the shaft generated by rotation of the work, so as to make the whole peripheral wall of the shaft sequentially face the first heating coil upon one complete revolution of the shaft around the hole. Thereby, the shaft is uniformly heated by induction. Consequently, both the shaft and the inner wall of the hole are well hardened.

The hardening device may also include a work rotating means for rotating the work around the shaft and a coil moving mechanism for moving the second heating coil together with movement of the hole generated by rotation of the work.

By such an arrangement, the work rotates around the shaft by the work rotating means. Thereby, the whole peripheral wall of the shaft sequentially faces the first heating coil upon one complete rotation of the shaft, so that the shaft is uniformly heated by induction. Further, the second heating coil revolves around the shaft together with the hole. Consequently, the inner wall of the hole is well heated by induction as well as the shaft.

It is possible to supply electricity having different frequencies to the first heating coil and to the second heating coil from different power sources respectively.

By such an arrangement, induction currents having different frequencies are supplied to the shaft and the inner wall of the hole. The both induction currents perform a favorable induction heating (hardening) of the shaft and a favorable induction heating (hardening) of the inner wall of the hole respectively.

The portion of the second heating coil inserted in the hole may be wound in such a manner that the number of coil turns between coil windings at a part nearer the shaft in the inner wall of the hole is different from that at a part farther from the shaft.

In such an arrangement, it is preferable that the number of the coil turns at the part nearer the shaft is more than that at the part farther from the shaft.

Alternatively, the portion of the second heating coil inserted in the hole may be wound in such a manner that pitches between the coil windings at the part nearer the shaft are different from those at the part farther from the shaft.

The hardening device may rotate the work with supporting the shaft eccentrically positioned from the hole that is a rotational center. Holding of the shaft allows a stable fixation of the work. That is, the work stably rotates with holding the shaft.

It is possible that the second heating coil is a secondary induction coil provided with a primary induction coil for generating an induction current in the second heating coil and that the second heating coil is movable along the primary induction coil.

By such an arrangement, the second heating coil is prevented from contacting with the primary induction coil. The second heating coil is subjected to excitation of an induction current by electromagnetic induction. Thus, the second heating coil is easy to move together with the hole of the revolving work.

In the hardening device, it is possible to include the first heating coil facing the shaft and the second heating coil inserted in the hole, wherein the first heating coil is a conductive body for conducting a high-frequency current and configured to be allowed to move vertically relative to an axis of the work and the second heating coil is a helical conductive body, the device further including a work rotating means for rotating the work around the hole and a coil moving mechanism for moving the first heating coil together with movement of the shaft generated by rotation of the work, wherein the rotating means is directed to rotate the work with supporting the shaft eccentrically positioned from the hole, wherein the number of coil turns of the second heating coil at a part nearer the shaft is more than that at a part farther from the shaft, and wherein the second heating coil is a secondary induction coil provided with a primary induction coil for generating induction current in the second heating coil, and that the second heating coil is movable along the primary induction coil.

As a further aspect of the present invention, it is possible to configure a hardening device for hardening a shaft vertically extending from a flat plate of a work and an inner wall of a hole formed on the flat plate, including a work rotating means for rotating the work around the hole, a first heating coil adapted to be moved closer to the shaft and for heating the shaft by induction, and a second heating coil having at least a portion to be inserted into the hole and for heating the inner wall of the hole by induction, wherein the work rotating means includes a driving shaft for rotating the work and a work eccentrically holding means to be secured to the driving shaft and for holding one selected from the shaft of the work and an extended portion of the shaft with an axis of the one aligned with a point eccentrically located relative to the axis of rotation of the driving shaft, the holding means having an eccentricity relative to the driving shaft equal to a length between the hole and the shaft of the work, so that the work is held by the holding means so as to align a center of the hole with an axis of the driving shaft, the device further including an energization means for energizing the first heating coil and the second heating coil, and the device revolving the shaft of the work around the hole by rotation of the driving shaft so as to move the first heating coil together with the revolution of the shaft, and energizing the first heating coil and the second heating coil so as to heat the shaft and the inner wall of the hole of the work respectively and simultaneously.

As a further aspect of the present invention, it is also possible to configure a hardening device for hardening a shaft vertically extending from a flat plate of a work and an inner wall of a hole formed on the flat plate, including a work rotating means for rotating the work around the shaft, a first heating coil adapted to be moved closer to the shaft and for heating the shaft by induction, a second heating coil having at least a portion to be inserted into the hole and for heating the inner wall of the hole by induction, and a coil revolving means for revolving the second heating coil around the shaft, wherein the work rotating means includes a driving shaft for rotating the work, the driving shaft having a rotational axis aligned with a rotational axis of the coil revolving means, wherein the second heating coil has a revolving radius equal to a length between the hole and the shaft of the work and is adapted to revolve by driving by the coil revolving means, the device further including an energization means for energizing the first heating coil and the second heating coil, the energizing means for energizing the second heating coil being adapted to excite an induction current to the second heating coil by electromagnetic induction, and the device revolving the hole around the shaft of the work by rotation of the driving shaft of the work rotating means and revolving the second heating coil by the coil revolving means so as to move the second heating coil together with the revolution of the hole, and energizing the first heating coil and the second heating coil so as to heat the inner wall of the hole and the shaft of the work respectively and simultaneously.

ADVANTAGEOUS EFFECT OF THE INVENTION

Embodiment of the hardening method of the present invention in hardening a wok having a shaft and a hole on a flat plate provides a favorable induction heating of both the shaft and the inner wall of the hole. Further, the hardening device of the present invention brings about a favorable induction heating of a work having a shaft and a hole on a flat plate.

BRIEF DESCRIPTION OF THE DRAWINGS

FIG. 13A is an exploded perspective view thereof and FIG. 13B is a perspective view of the assembled built-up crank.

DESCRIPTION OF THE PREFERRED EMBODIMENT

Now, a preferred embodiment of the present invention will be described in detail below, making reference to the accompanying drawings.

Figure 1A:
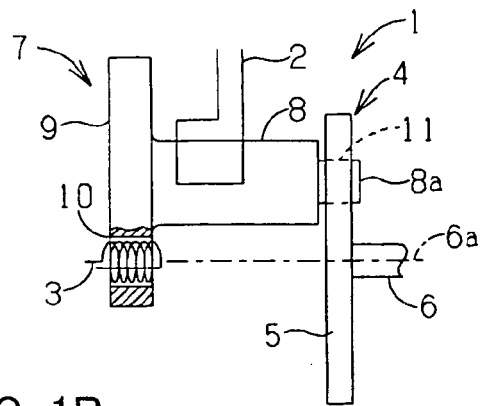
FIGS. 1A to 1D are explanatory diagrams for explaining a series of operations whereby a work is hardened by a hardening device of an embodiment of the invention.

As shown in FIG. 1A, a work 7 to be hardened by a hardening device 1 includes a flat plate 9 and a shaft 8. The flat plate 9 is of a circular-disc shape with the shaft 8 arranged in a center thereof. The shaft 8 extends in the center of the flat plate 9.

The flat plate 9 has a hole 10, which is formed adjacent to the shaft 8. The center of the flat plate 9 is not aligned with a center of the hole 10. The hole 10 is formed at an outlying part, i.e., not the center, of the flat plate 9 of the circular-disc shape.

Figure 13A:
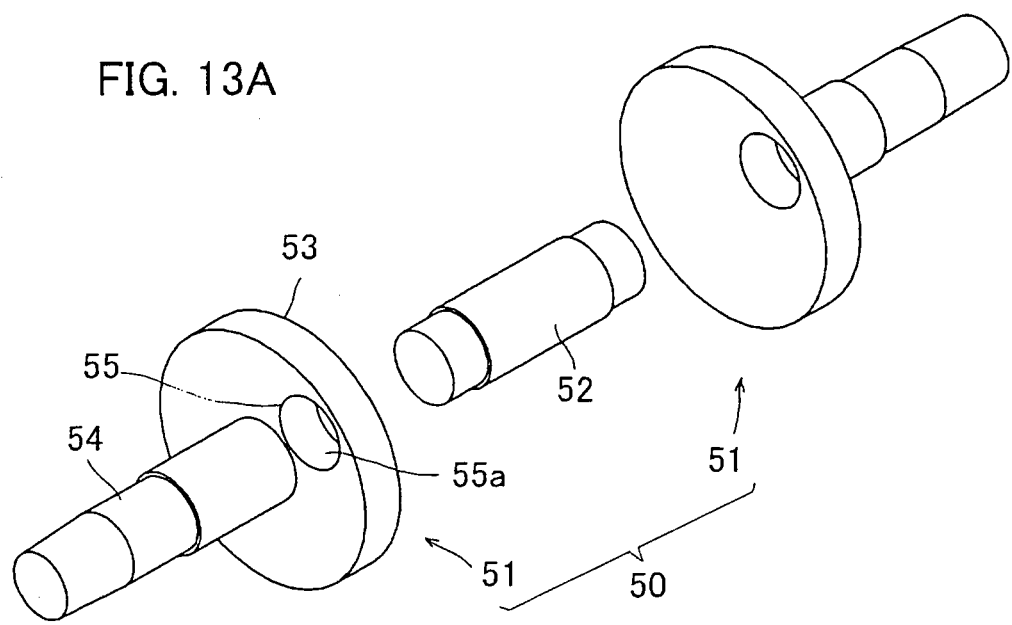
FIGS. 13A and 13B are perspective views of a built-up crank.
Figure 13B:
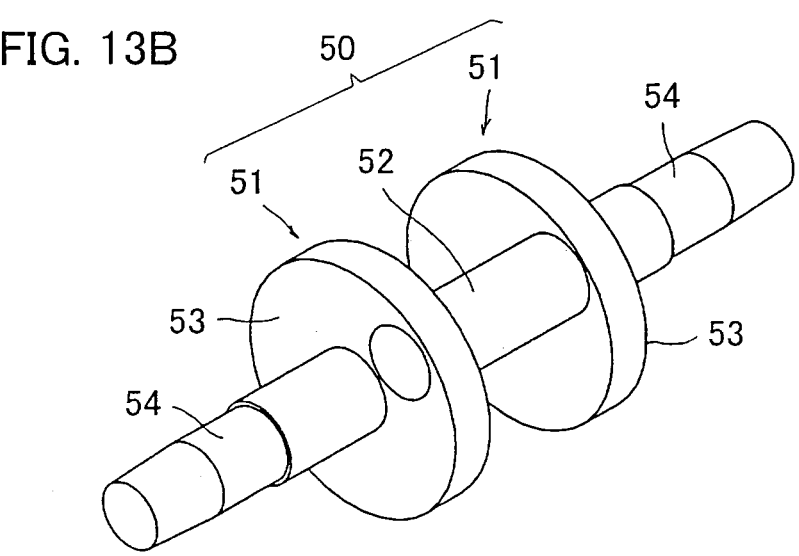

The work 7 having such a shape described above is used, for example, as a component (part 51) of a built-up crank 50 shown in FIG. 13A. The work 7 is hardened by the hardening device 1.

Hereafter, a configuration of the hardening device 1 will be firstly described in detail and then operation of the hardening device 1 will be described in detail.

As shown in FIGS. 1A to 1D, the hardening device 1 includes a first heating coil 2, a second heating coil 3, an eccentric rotating device (work rotating means) 4, and a cooling equipment not shown. The cooling equipment has no relation with an essential part of the invention, and thus an illustration thereof is omitted in each drawing.

The first heating coil 2 is a conductive body for conducting a high-frequency current and configured to be allowed to move vertically relative to an axis of the work 7 and so called a saddle-shaped coil.

Figure 14:
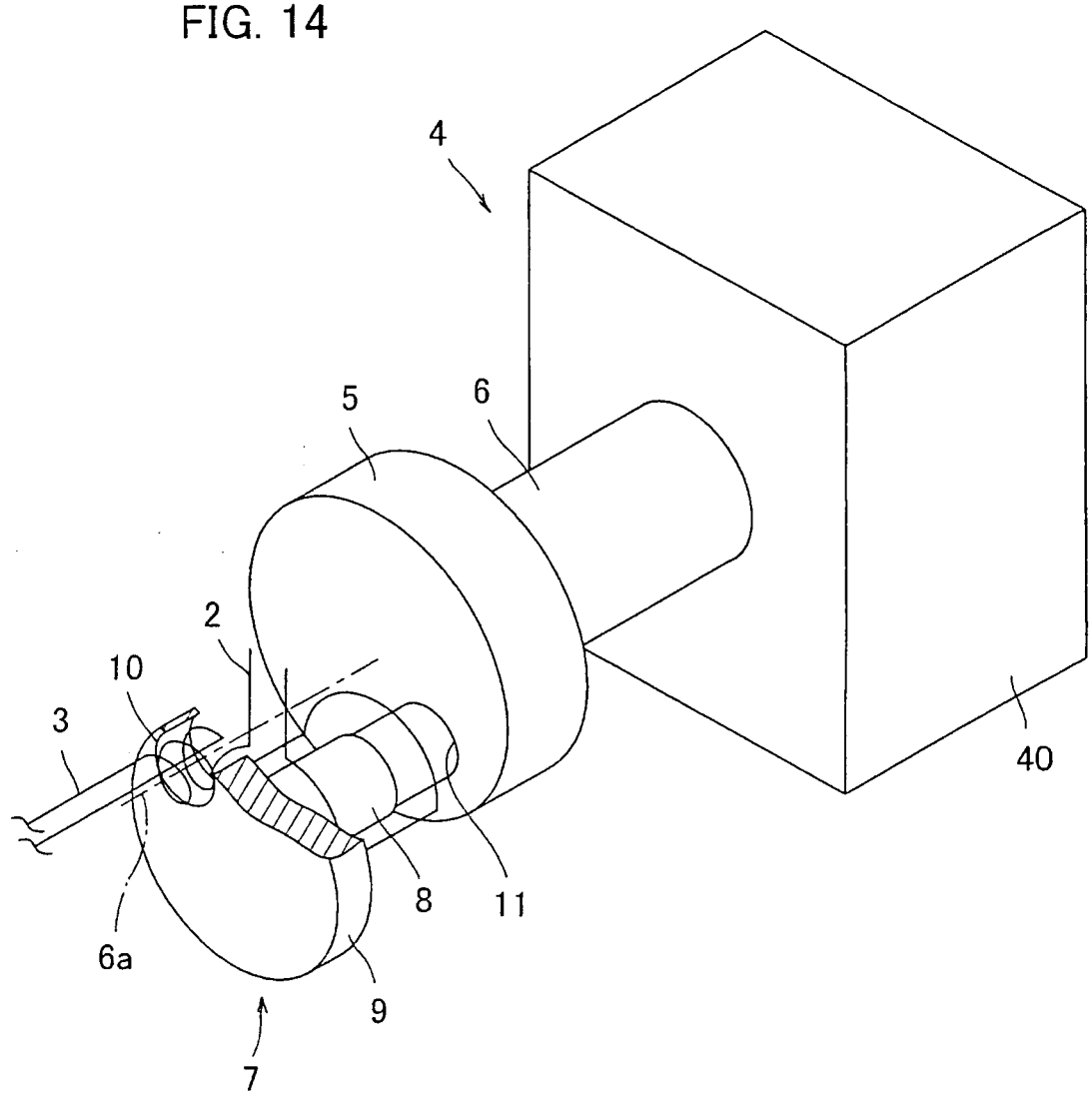
FIG. 14 is a perspective view of a rotating device for rotating a work around a hole, a first heating coil, and a second heating coil.

Specifically, the saddle-shaped coil is an induction heating coil having a configuration denoted by the numeral 2 in FIG. 14. The saddle-shaped coil faces a half part of a peripheral wall of a columnar shape of the shaft 8 without facing another half part of the peripheral wall, having a shape like a saddle placed on a back of a horse. Thus, the saddle-shaped coil can be moved toward the shaft 8 in a radial direction so as to face the shaft 8, or can be moved away from the shaft 8 in a radial direction so as to be kept away from the shaft 8.

In FIGS. 1A to 2D, the first heating coil 2 is simply illustrated, but actually has a shape as shown in FIG. 14.

The first heating coil 2 is subjected to excitation of a high-frequency induction current by a first high-frequency converter (or transmitter or energizing means) 12, which converts frequency of an alternating current of a commercial power source 45 into high frequency, and transformer 28. Further, the first heating coil 2, which is a known saddle-shaped coil as described above, is normally pressed onto the work 7 via a spacer (not shown) so as to keep a constant distance between the coil 2 and the work 7 (the shaft 8) in hardening. The first heating coil 2 eccentrically rotates (revolves) along a track 35 by a coil moving mechanism 30 as shown in FIGS. 11A to 11D so as to be moved together with rotational movement of the shaft 8 generated by rotation of the work 7.

FIGS. 11A to 11D are front views of the coil moving mechanism 30. In the figures, only the shaft 8 of the work 7 is illustrated for convenience. A center 8a of the shaft 8 rotates (revolves) along the track 35 shown by a dashed line in the figures. The coil moving mechanism 30 moves the first heating coil 2 together with the movement of the shaft 8.

The coil moving mechanism 30 includes a support 41, a vertical guiding member 42, and a horizontal guiding member 43. The support 41 is anchored in a vertical position. The vertical guiding member 42 is slidably fixed to the support 41. The vertical guiding member 42 supports the horizontal guiding member 43, which reciprocates in a vertical direction along a guide 42a of the vertical guiding member 42. The horizontal guiding member 43 is provided with the transformer 28, which reciprocates in a horizontal direction along the horizontal guiding member 43. The transformer 28 is connected to the first high-frequency converter 12 through a flexible lead. A circuit for exciting an induction current to the first heating coil 2 by a current supplied from the commercial power source 45 will be described later.

The vertical guiding member 42 has a height adjusted in accordance with a level where the work 7 (shaft 8) is located. After adjustment of the height, the vertical guiding member 42 is fixed to the support 41 by a fixing mechanism not shown.

Figure 11A:
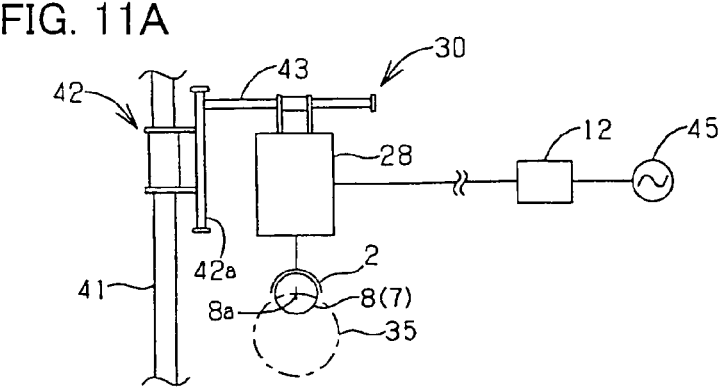
FIGS. 11A to 11D are front views showing a series of operations of a coil moving mechanism for moving the first heating coil together with revolution of a shaft.
Figure 11B:
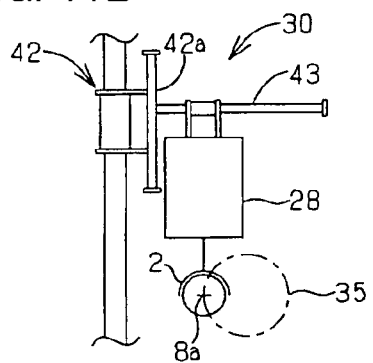

In a state shown in FIG. 11A, the shaft 8 is positioned at a top dead center (at the 12 o'clock position) in the track 35. When the shaft 8 moves from the state shown in FIG. 11A to a state shown in FIG. 11B, that is, in a counterclockwise direction along the track 35, the horizontal guiding member 43 descends for a distance corresponding to a radius of the track 35 and simultaneously the transformer 28 moves to the left for the distance corresponding to the radius of the track 35 along the horizontal guiding member 43. Thereby, as shown in FIG. 11B, the first heating coil 2 moves together with the shaft 8, so as to move to the 9 o'clock position along the track 35.

The shaft 8 subsequently moves from the state shown in FIG. 11B to a state shown in FIG. 11C, that is, to a bottom dead center (at the 6 o'clock position). In this movement, the horizontal guiding member 43 descends for the distance corresponding to the radius of the track 35 and simultaneously the transformer 28 moves to the right for the distance corresponding to the radius of the track 35.

Figure 11C:
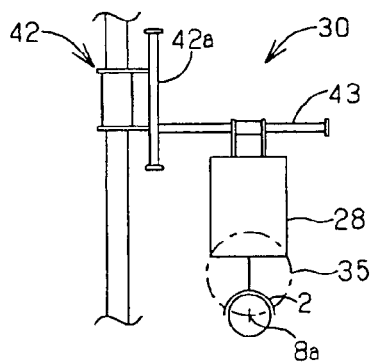
Figure 11D:
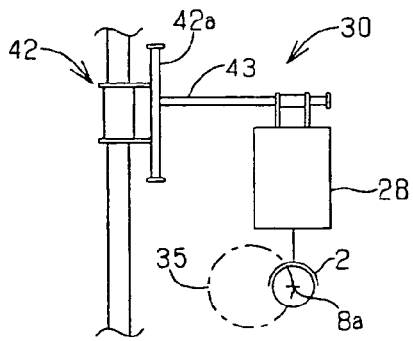

Further, when the shaft 8 moves from the state shown in FIG. 11C to a state shown in FIG. 11D, that is, to the 3 o'clock position, the horizontal guiding member 43 ascends for the distance corresponding to the radius of the track 35 and simultaneously the transformer 28 moves to the right for the distance corresponding to the radius of the track 35.

Still further, when the shaft 8 moves from the state shown in FIG. 11D to the state shown in FIG. 11A, the horizontal guiding member 43 ascends for the distance corresponding to the radius of the track 35 and simultaneously the transformer 28 moves to the left for the distance corresponding to the radius of the track 35.

Repetition of the movements described above by the coil moving mechanism 30 makes the first heating coil 2 move (revolve) together with the shaft 8 moving (revolving) along the track 35.

In order to reciprocate the horizontal guiding member 43 in a vertical direction, a servomotor can be used, for example. Also in order to reciprocate the transformer 28 in a horizontal direction, it is preferable to use a servomotor. The first heating coil 2 moves (revolves) along the track 35 by making the horizontal guiding member 43 and the transformer 28 move for the same distance at the same time by the servomotors and by appropriately changing their moving directions. Two servomotors may be used so as to synchronize the movements of the horizontal guiding member 43 and the transformer 28. Alternatively, one servomotor may be used so as to distribute a driving force by a mechanical system such as a gear. Further, a switching mechanism may be provided for switching a rotational direction of the shaft 8.

On the other hand, the second heating coil 3 is a helical conductive body. The second heating coil 3 is supplied with a high-frequency current via a second high-frequency converter (or transmitter or energizing means) 13 and a transformer 29. An electrical current supplied from the commercial power source 45 is converted to a high-frequency current by the second high-frequency converter 13.

The second heating coil 3 is movable in a horizontal direction in FIGS. 1A to 1D by a driving device not shown. The second heating coil 3 moves from the left to the right in the figures so as to be inserted into the hole 10 and remains static in the hole 10 during induction heating.

Herein, in induction heating of the work 7 by the two heating coils 2 and 3, it is possible to control to appropriately execute induction heating of the work 7 by bringing start time points of the induction heating by the first and second heating coils 2 and 3 simultaneous or staggering. The same can be said to termination time points of induction heating thereby and periods of time duration for induction heating thereby.

Further, it is possible to appropriately control a jetting time point of coolant in response to the termination time points of the induction heating. After termination of induction heating, the shaft 8 and the inner wall of the hole 10 are cooled by the coolant jetted from the cooling equipment not shown, and whereby hardening is completed.

The eccentric rotating device 4 includes, as shown in FIGS. 1A to 1D and 14, a circular plate (work eccentrically holding means) 5 and a rotational shaft (driving shaft) 6. The rotational shaft 6 is driven by a motor 40. A center of the circular plate 5 is aligned with a center of the rotational shaft 6. The rotational shaft 6 is unitarily secured to the center of the circular plate 5. Thus, rotational driving of the rotational shaft 6 by the motor 40 rotates the circular plate 5 at the same time.

The circular plate 5 has a hole 11, which is formed at an outlying part, i.e., not the center, of the circular plate 5 and in which a distal portion 8a of the shaft 8 of the work 7 is fitted by insertion. Shortly, the work 7 is cantilevered with the shaft 8 fitted in the hole 11 of the circular plate 5 by insertion. The distal portion 8a is movable in an axial direction relative to the hole 11, but unmovable in a rotational direction. Therefore, the work 7 and the circular plate 5 avoid relative rotation.

Further, as shown in FIGS. 1A to 1D and 14, an imaginary center line 6a (passing through the center of the circular plate 5) of the rotational shaft 6 is aligned with the center of the hole 10 of the work 7.

Further, as shown in FIG. 1A, a center 8b of the shaft 8 is away from the center (rotational center) of the hole 10 for a distance (eccentricity) E. The distal portion 8a is not heated by induction, so that the portion 8a may be cut out after completion of hardening of the work 7.

Herein, as thus far described, the eccentric rotating device 4 is provided with the circular plate 5 having the hole 11, but instead of the circular plate 5, may be provided with a chuck for holding the shaft 8. Specifically, it is possible to employ a configuration in which an arm is fixed to the rotational shaft 6 and has a chuck. Driving of the motor 40 with holding the shaft 8 by the chuck makes the shaft 8 move (revolve) along the track 35 (FIGS. 11A to 11D). Employment of the configuration in which the shaft 8 is held by the chuck facilitates attachment and detachment of the shaft 8 (work 7).

The hardening device 1 is configured as described above. Now, operation of the hardening device 1 will be described below.

Upon rotational driving of the rotational shaft 6 of the eccentric rotating device 4 by the motor 40, the inner wall of the hole 11 of the circular plate 5 rotates around the center line 6a. Simultaneously, the work 7 fitted in the hole 11 by insertion rotates (revolves) around the center line 6a (that is, the center of the hole 10 of the work 7) together with the circular plate 5.

Figure 1B:
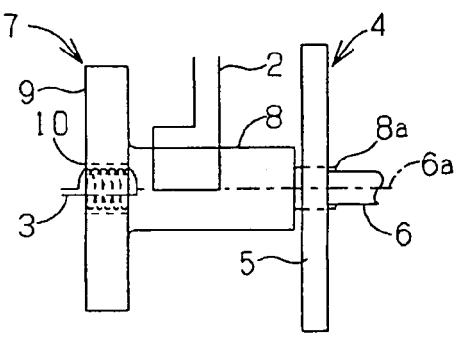
Figure 1C:
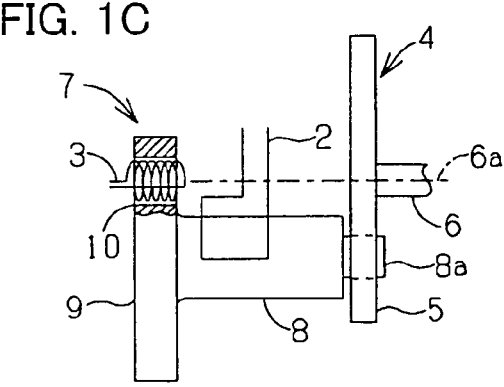
Figure 1D:
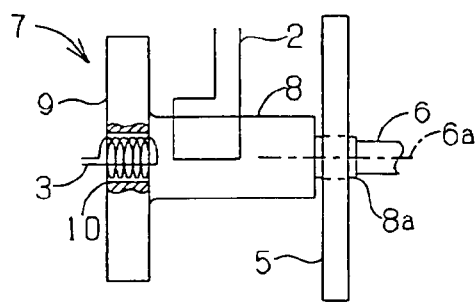
Figure 2A:
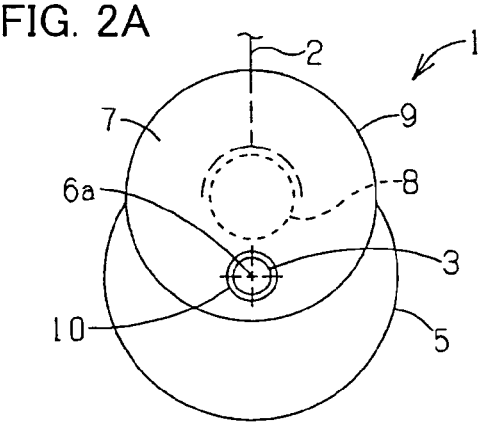
FIGS. 2A to 2D are explanatory diagrams seen from the left of FIGS. 1A to 1D respectively.
Figure 2B:
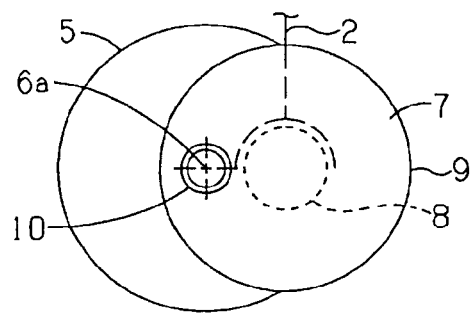
Figure 2C:
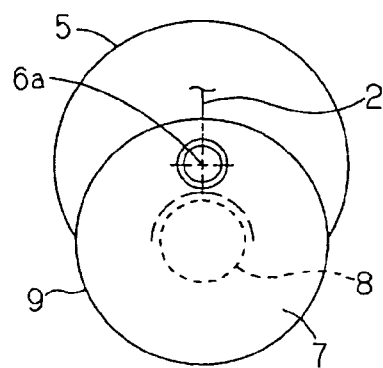
Figure 2D:
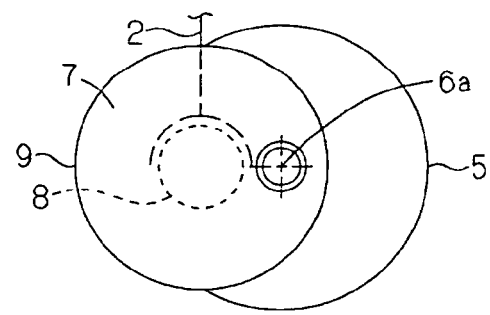

When the shaft 8 revolves 90 degrees clockwise around the center line 6a of the rotational shaft 6, that is, from a state shown in FIGS. 1A and 2A to a state shown in FIGS. 1B and 2B, a part of the peripheral wall of the shaft 8 facing the first heating coil 2 shifts from an upper side (farther side from the hole 10) to a left side in FIG. 1A. When the shaft 8 revolves further 90 degrees clockwise, that is, to a state shown in FIGS. 1C and 2C, a lower side (nearer side to the hole 10) in FIG. 1A comes to face the first heating coil 2. In this way, upon reverting to the state shown in FIG. 1A, from the state shown in FIG. 1A through the states shown in FIGS. 1B and 1C and further through a state shown in FIG. 1D, whole peripheral wall of the shaft 8 faces the first heating coil 2 so as to be uniformly heated by induction.

The center of the hole 10 remains unmoved at a position aligned with the center line 6a of the rotational shaft 6 even though the work 7 revolves around the center line 6a. Further, a distance between the inner wall of the hole 10 and the second heating coil 3, which is inserted in the hole 10 and static (i.e., nonrotating), also remains constant. However, the inner wall of the hole 10 also rotates one revolution around the center line 6a, in accordance with one revolution of the work 7 around the center line 6a from a position shown in FIG. 1A through those shown in FIGS. 1B, 1C, and 1D reverting to that shown in FIG. 1A. At this time, since the second heating coil 3 is helical, a part of the inner wall of the hole 10 facing to the second heating coil 3 shifts along with rotation of the inner wall of the hole 10. Thereby, the inner wall of the hole 10 is uniformly heated by induction.

As a consequence, the inner wall of the hole 10 and the shaft 8 of the work 7 are simultaneously heated by induction and simultaneously hardened. The inner wall of the hole 10 and the shaft 8 both having been heated by induction are simultaneously cooled by the coolant supplied by a cooling jacket not shown. The hardening is completed.

Figure 5:
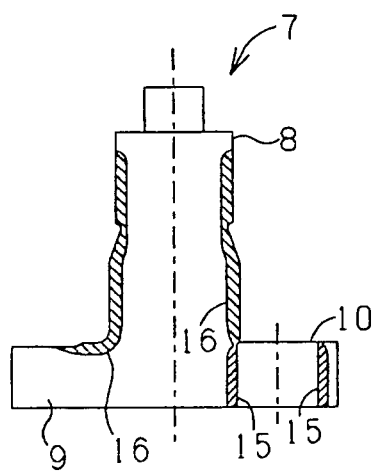
FIG. 5 is a schematic view showing a hardened state of a work by the hardening device of the present invention.
Figure 6:
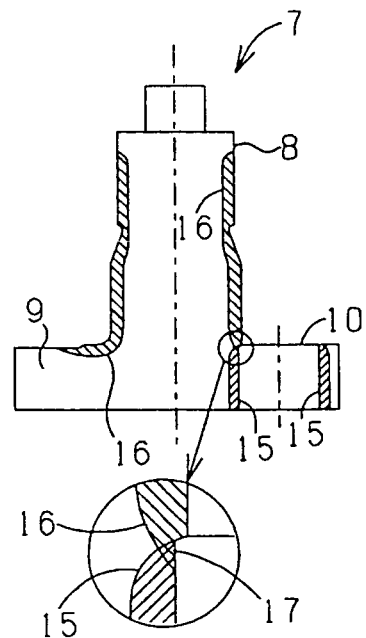
FIG. 6 is a schematic view showing a hardened state of a work by a conventional hardening device.
Figure 7:
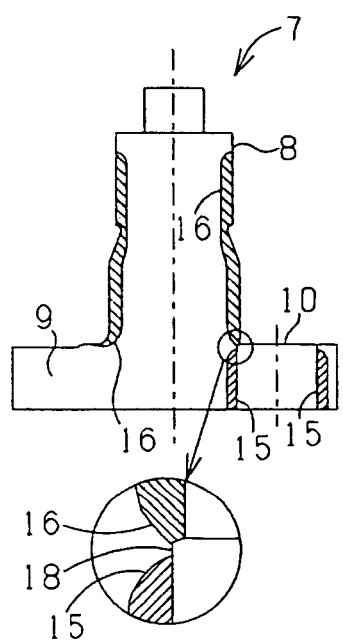
FIG. 7 is a schematic view showing another hardened state of a work by the conventional hardening device.

Since being simultaneously heated by induction and hardened, the shaft 8 and the inner wall of the hole 10 rises in temperature to the same degree. That achieves a continuous hardened pattern of the shaft 8 and the inner wall of the hole 10, as shown in FIG. 5. FIG. 5 is a schematic view showing the hardened state of the work 7. FIGS. 6 and 7 are each a schematic view showing a hardened state of a work by a conventional hardening device.

As shown in FIG. 6, duplicated hardenings in the conventional way form a hardened pattern (shown by downward-sloping hatching) 16 of the shaft-side and another hardened pattern (shown by upward-sloping hatching) 15 of the hole-side, resulting in forming an overlapping hardened region 17. The overlapping region 17 is easy to break. By contrast, as shown in FIG. 7, hardening of the shaft-side and the hole-side so as to avoid formation of the overlapping region 17 results in formation of a region 18 poorly heated by induction. However, according to the hardening method or the hardening device of the present embodiment, simultaneous heating of the shaft 8 and the inner wall of the hole 10 avoids duplicated hardened pattern, as shown in FIG. 5. Specifically, a hardened pattern of the shaft-side by the first heating coil 2 and a hardened pattern of the hole-side by the second heating coil 3 form a seamless whole.

Next, another embodiment of the present invention will be described in detail below.

Figure 3A:
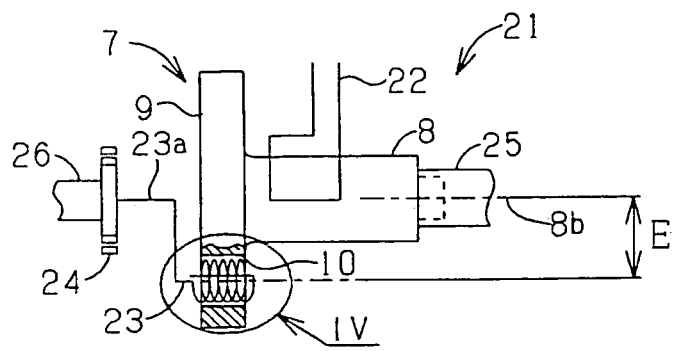
FIGS. 3A to 3D are explanatory diagrams for explaining another series of operations whereby a work is hardened by a hardening device of another embodiment of the invention.
Figure 3B:
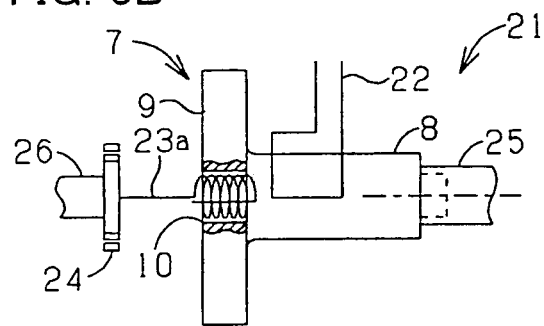
Figure 3C:
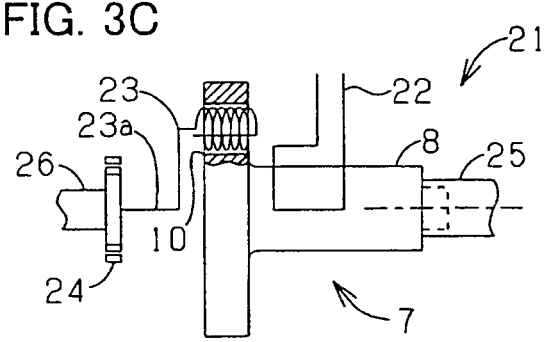
Figure 3D:
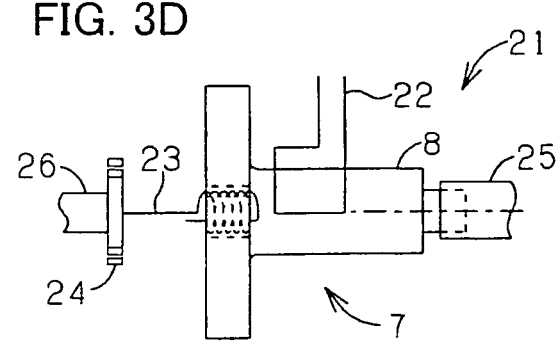
Figure 4:
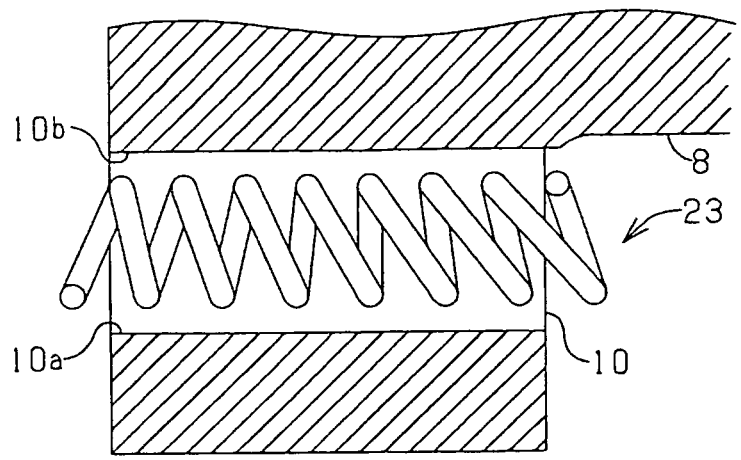
FIG. 4 is an enlarged view of an IV region in FIG. 3A.

FIGS. 3A to 3D are explanatory diagrams for explaining another series of operations whereby a work is hardened by a hardening device of the other embodiment of the invention. FIG. 3B shows a state in which the work 7 has rotated 90 degrees from a state shown in FIG. 3A to a near and upper side of the paper, FIG. 3C shows a state in which the work 7 has rotated 90 degrees from the state shown in FIG. 3B, and FIG. 3D shows a state in which the work 7 has rotated 90 degrees from the sate shown in FIG. 3C to a far and lower side of the paper. FIG. 4 is an enlarged view of an IV region in FIG. 3A.

Referring to FIGS. 3A to 3D, the work 7 rotates around the shaft 8 of the work 7. As a consequence, the inner wall of the hole 10 revolves around the shaft 8. A distance E between the center 8b of the shaft 8 and the center of the hole 10 corresponds to an eccentricity.

As shown in FIG. 3A, a hardening device 21 includes a first heating coil 22, a second heating coil 23, a rotating device (work rotating means) 25, and another rotating device (coil revolving means) 26. The first heating coil 22 is a saddle-shaped coil, being the same coil as the first heating coil 2 in the foregoing embodiment. The first heating coil 22 dispenses with the coil moving mechanism 30 provided in the first heating coil 2 and is static.

Figure 12:
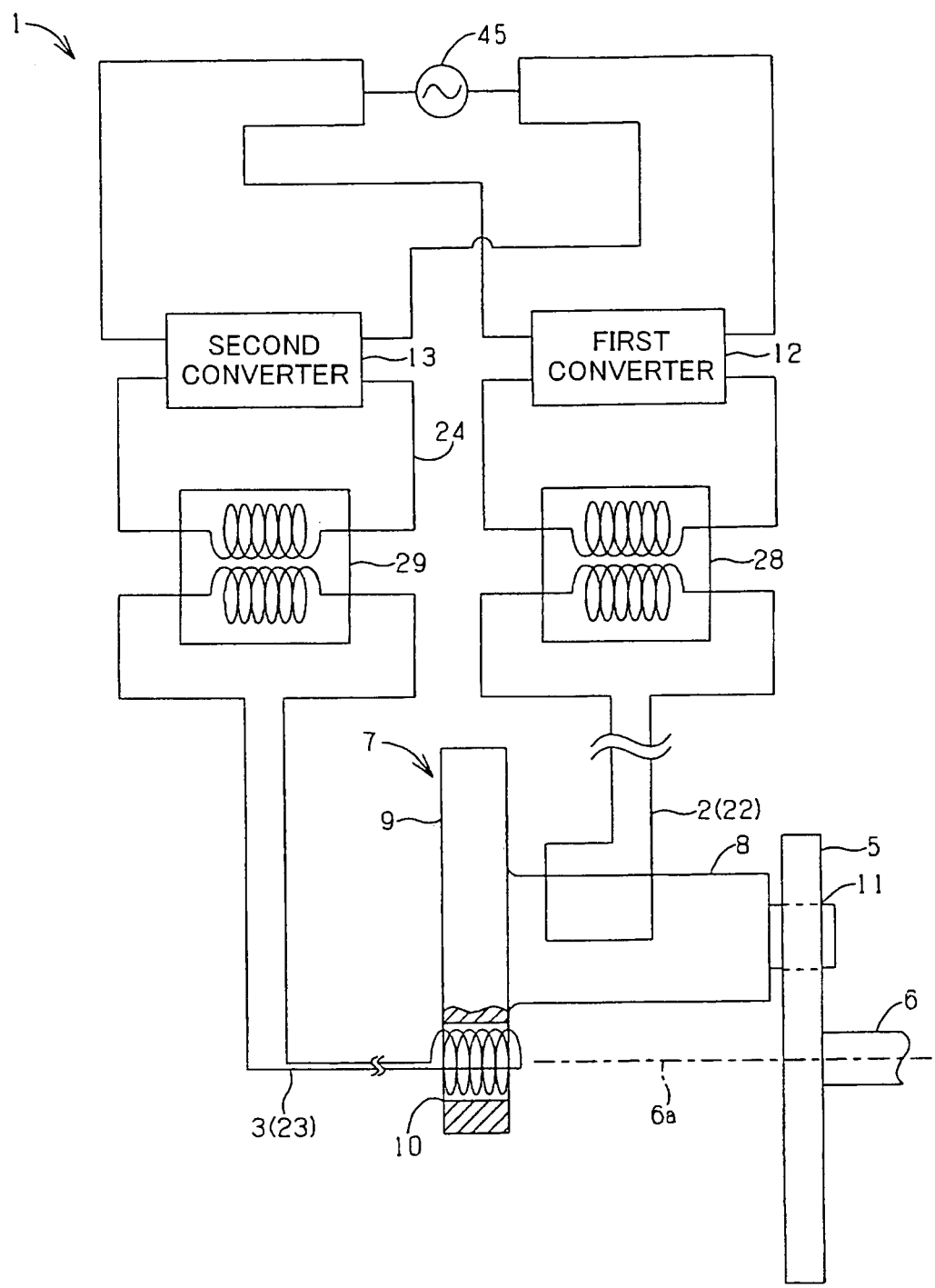
FIG. 12 is a circuit diagram for supplying a high-frequency current to the first heating coil and to the second heating coil so as to heat a work by induction.

The second heating coil 23 is a helical conductive body, constituting a secondary coil. Specifically, as shown in FIG. 12, frequency of a current supplied from the commercial power source 45 is converted to high frequency to generate a primary induction current, which is supplied to a primary coil 24 of a transformer 29. The second heating coil (secondary coil) 23 is subjected to excitation of a secondary induction current by the high-frequency primary induction current flowing in the primary coil 24.

A helical portion of the second heating coil 23 is inserted in the hole 10 of the work 7. The second heating coil 23 has an arm 23a extending in a radial direction of the work 7 and is revolved by the rotating device 26. An axis of the rotating device 26 is aligned with an axis of the rotating device 25 for rotating the shaft 8. The rotating device (coil revolving means) 26 is driven in synchronization with driving of the rotating device (work rotating means) 25, thereby preventing relative movement of the helical portion of the second heating coil 23 and the hole 10 of the work 7. In other words, when the hole 10 revolves around the shaft 8, the second heating coil 23 also revolves.

FIG. 3B shows the state in which the hole 10 of the work 7 and the second heating coil 23 has revolved 90 degrees from the state shown in FIG. 3A to the near and upper side of the paper. At this time, the shaft 8 only rotates, with its rotational center remaining unmoved. Thus, a part of the peripheral wall of the shaft 8 facing the first heating coil 2 shifts 90 degrees, but a distance between the shaft 8 and the first heating coil 22 remains constant.

Through further revolution as shown in FIGS. 3C and 3D, the second heating coil 23 and the hole 10 of the work 7 are prevented from relative movement therebetween. Through further revolution of 90 degrees from the state shown in FIG. 3D to that shown in FIG. 3A, the second heating coil 23 and the hole 10 revert to the first state (one revolution). Meanwhile, the first heating coil 22 remains static at the same position, so that the whole peripheral wall of the shaft 8 is uniformly heated by induction by rotation of the shaft 8.

Referring to FIG. 4 showing an enlarged view of the IV region in FIG. 3A, a surrounding area of the hole 10 is not formed uniformly. There exists the shaft 8 adjacent to the hole 10. Thus, even though the second heating coil 23 heats the inner wall of the hole 10 uniformly, heat onto an inner wall 10b adjacent to the shaft 8 is readily dissipated toward the shaft 8. This might result in a difficulty in less temperature rising than an opposite inner wall 10a.

In order to solve the above-mentioned difficulty, the second heating coil 23 is deformed so as to have more coil turns near the inner wall 10b (near the shaft 8) than those near the inner wall 10a. That produces a difference in heating, whereby the inner wall of the hole 10 rises wholly in temperature to a similar extent. In an example shown in FIG. 4, there are seven coil turns near the inner wall 10b and six coil turns near the inner wall 10a. That is, the second heating coil 23 is moved together with the work 7 (hole 10) so that the seven coil turns thereof normally face the inner wall 10b and the six coil turns thereof normally face the inner wall 10a. A configuration for rotating the second heating coil 23 will be described later.

In contrast to the above-mentioned difficulty, for additional consideration of heat transfer from the shaft 8, which is subjected to induction heating by the first heating coil 22, to the hole 10, the coil turns near the inner wall 10b can be set fewer than those near the inner wall 10a, thereby uniformly rising the whole inner wall of the hole 10 in temperature.

Figure 8:
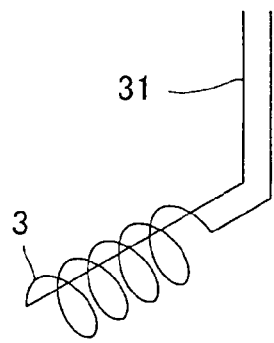
FIG. 8 is a perspective view of a second heating coil held without rotating nor revolving.
Figure 9:
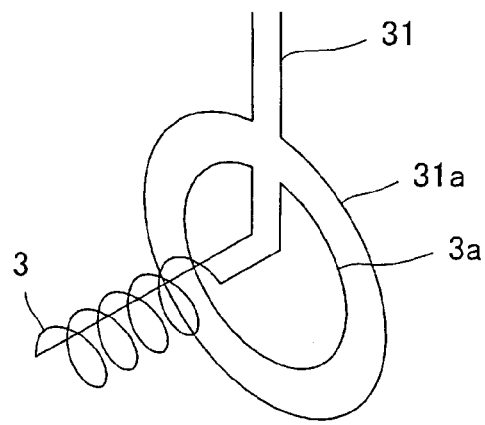
FIG. 9 is a perspective view of the second heating coil being rotatable.
Figure 10:
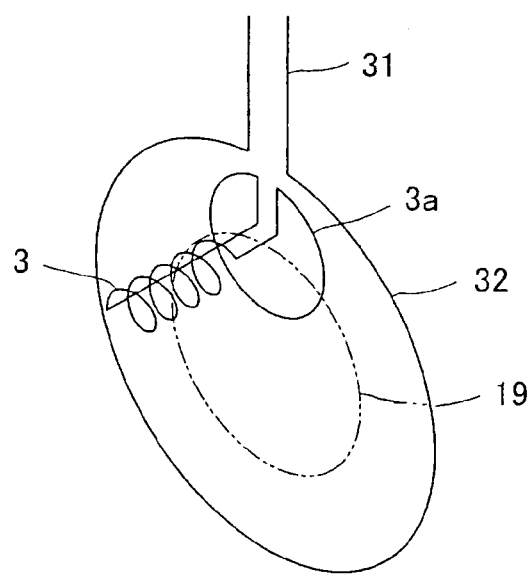
FIG. 10 is a perspective view of the second heating coil being rotatable and further being revolvable along a primary coil.

FIG. 8 is a perspective view of the second heating coil 3. In a case of using the second heating coil 3 in the embodiment shown in FIGS. 1A to 1D, the second heating coil 3 is not allowed to rotate nor revolve. In contrast, in a case of using the second heating coil 3 in the embodiment shown in FIGS. 3A to 3D, the second heating coil 3 is made revolve. FIG. 9 is a perspective view of the second heating coil 3 being rotatable. FIG. 10 is a perspective view of the second heating coil 3 being rotatable and further being revolvable along the primary coil.

As shown in FIG. 8, the second heating coil 3 is helical and connected to a conductive body 31. The second heating coil 3 shown in FIG. 8 is used in rotation of the work 7 around the hole 10 as shown in FIGS. 1A to 1D. Since rotation of the work 7 rotates the inner wall of the hole 10 to be hardened, the inner wall of the hole 10 rotates relatively to the second, heating coil 3 even though the second heating coil 3 remains static, so as to be uniformly hardened. Consequently, employment of the configuration shown in FIG. 8 simplifies the configuration of the second heating coil 3 and is efficient because of no need for electromagnetic induction as shown in FIGS. 9 and 10 described below.

A further embodiment shown in FIG. 9 is provided with a primary coil 31a of one turn for generating an induction current in the second heating coil (secondary coil) 3 arranged in a concentric fashion at an outer side of an annular portion 3a united with the second heating coil 3. The primary coil 31a is fixed by an insulator not shown, by which the second heating coil (secondary coil) 3 is rotatably supported. Supplying of a high-frequency current to the primary coil 31a generates a high-frequency induction current in the second heating coil (secondary coil) 3. In FIG. 9, the second coil 3 is rotatable by a motor not shown. Rotation of the second heating coil 3 allows relative rotation between the primary coil 31a and the annular portion 3a but no distance fluctuation therebetween.

In a case of induction heating of the work 7 by the hardening device 1 shown in FIGS. 1A to 1D, both rotation of the work 7 by the eccentric rotating device (first rotating means) 4 and rotation of the second heating coil 3 in the opposite direction by a rotating device not shown increase a relative rotational speed of the inner wall of the hole 10 of the work 7 and the second heating coil 3, thereby ensuring uniform induction heating of the inner wall of the hole 10.

On the other hand, it is also possible to rotate the second heating coil 3 (23) so that the inner wall of the hole 10 and the second heating coil 3 (23) are prevented from relative rotation therebetween. Specifically, as shown in FIG. 4, in a case where the number of coil turns near the inner wall 10b is different from that near the inner wall 10a, the second heating coil 3 (23) having the configuration shown in FIG. 9 is employed. The second heating coil 3 (23) is made rotate together with rotation of the work 7 so that seven coil turns of the second heating coil 3 (23) always face the inner wall 10b (in a case shown in FIG. 4).

Though, in FIG. 9, the second heating coil 3 comes in the center (rotational center) of the annular portion 3a, it is possible to allow the second heating coil 3 to revolve along the track 35 shown in FIGS. 11A to 11D. Specifically, the second heating coil 3 is arranged on a circumference of the annular portion 3a, a radius of which is conformed to the radius of the track 35. According to such an arrangement, driving of a rotating device not shown rotates the annular portion 3a, thereby revolving the second heating coil 3 along the circumference of the annular portion 3a, i.e., along the track 35. That responds to a case where the hole 10 is made revolve as shown in FIGS. 3A to 3D.

In a still further embodiment shown in FIG. 10, the second heating coil 3 revolves together with the rotating device, which rotates the coil 3, along a circular track 19 shown by a chain double-dashed line by an eccentric rotating device (not shown) having a configuration similar to that of the eccentric rotating device 4. Shortly, the second heating coil 3 revolves along the circular track 19 with rotating. The second heating coil 3 moves in a direction shown by an arrow along the circular track 19 with maintaining a constant distance between the primary coil 32 and the annular portion 3a. In this case, the second heating coil 3 revolves along the track 35 by bringing the circular track 19 in conformity with the track 35 in FIGS. 11A to 11D. The embodiment shown in FIG. 10, as shown in FIGS. 3A to 3D, can be employed in revolution of the hole 10 of the work 7.

In a case of eccentric rotation of the work 7 around the hole 10 (center line 6a) as shown in FIGS. 1A to 1D, a configuration in which the second heating coil 3 is rotatable as shown in FIG. 9 allows discretionary rotation of the second heating coil 3 relative to the hole 10, thereby providing a better hardening environment.

Further, in a case of rotation of the work 7 around the shaft 8 as shown in FIGS. 3A to 3D, the second heating coil 3 can be configured as shown in FIG. 10. Specifically, though rotation of the work 7 around the shaft 8 revolves the hole 10, the second heating coil 3 configured as shown in FIG. 10 is made move together with the hole 10.

The invention claimed is:

1. A hardening method for hardening a shaft and an inner wall of a hole of a work, the shaft vertically extending from a flat plate of the work and having a center, the hole having a center and formed in the flat plate adjacent to the shaft so that the centers are spaced from each other, the method comprising the steps of heating the shaft by high-frequency induction with a first heating coil and simultaneously heating the inner wall by high-frequency induction with a second heating coil while rotating the work around one of the centers so that the shaft and first heating coil relatively turn around the center of the shaft and the inner wall and second heating coil relatively turn around the center of the hole during the heating step.

2. The method as defined in claim 1, wherein the first heating coil is a conductive body for conducting a high-frequency current and configured to be allowed to move vertically relative to an axis of the work, and wherein the second heating coil is a helical conductive body having at least a portion inserted in the hole of the work.

3. The method as defined in claim 1, rotating the work around the hole and simultaneously moving the first heating coil in a circular manner so that the first heating coil moves together with the shaft.

4. The method as defined in claim 1, rotating the work around the shaft and simultaneously moving the second heating coil in a circular manner so that the second heating coil moves together with the hole.

5. The method as defined in claim 1, supplying electricity to the first heating coil and to the second heating coil from different power sources.

6. The method as defined in claim 2, wherein the portion of the second heating coil inserted in the hole is wound in such a manner that either the number of coil turns or pitches between coil windings at a part nearer the shaft in the inner wall of the hole are different from that at a part farther from the shaft.

7. The method as defined in claim 6, wherein either the number of the coil turns at the part nearer the shaft is more than that at the part farther from the shaft or the pitches between the coil windings at the part nearer the shaft are narrower than those at the part farther from the shaft.

8. The method as defined in claim 3, rotating the work with supporting the shaft.

* * * * *

UNITED STATES PATENT AND TRADEMARK OFFICE
CERTIFICATE OF CORRECTION

PATENT NO. : 8,569,664 B2  Page 1 of 1
APPLICATION NO. : 12/653310
DATED : October 29, 2013
INVENTOR(S) : Junji Minoue et al.

It is certified that error appears in the above-identified patent and that said Letters Patent is hereby corrected as shown below:

On the title page below Item (22) insert the following:

-- (30)    Foreign Application Priority Data

Dec. 12, 2008    (JP) ............................. 2008-316954 --

Signed and Sealed this
Twenty-fourth Day of December, 2013

Margaret A. Focarino
*Commissioner for Patents of the United States Patent and Trademark Office*